United States Patent [19]

Cooper

[11] 4,116,212
[45] Sep. 26, 1978

[54] UNIDIRECTIONAL FLOW CONTROL VALVE

[75] Inventor: Roydon B. Cooper, Locust Valley, N.Y.

[73] Assignee: Pall Corporation, Glen Cove, N.Y.

[21] Appl. No.: 696,110

[22] Filed: Jun. 14, 1976

[51] Int. Cl.$^2$ ............................................. F16K 21/00
[52] U.S. Cl. ..................................... 137/220; 137/508; 137/540
[58] Field of Search ................ 137/219, 220, 508, 540

[56] References Cited

U.S. PATENT DOCUMENTS

| 2,807,238 | 9/1957 | Pilch | 137/508 X |
| 2,841,171 | 7/1958 | Baker | 137/508 X |
| 3,092,133 | 6/1963 | Clark | 137/220 |
| 3,633,608 | 1/1972 | Minkner | 137/220 |
| 3,654,950 | 4/1972 | Hamm | 137/219 |
| 3,856,043 | 12/1974 | Feild | 137/508 |

Primary Examiner—Harold W. Weakley

[57] ABSTRACT

A unidirectional tubular energy-conserving axial flow control vave is provided, capable when open of accommodating the full flow of fluid through a fluid line at uniform velocity and a high flow rate with a negligible pressure drop comprising, in combination, a valve housing; a valve fluid flow passage therethrough substantially free from sharp bends and abrupt changes in direction and having an enlarged intermediate portion; a valve seat disposed in the enlarged portion of the fluid flow passage, defining the passage as an annulus about the outer periphery of the valve seat; a tubular valve element reciprocably disposed in a portion of the flow passage and movable between open and closed positions, into and away from engagement with the valve seat; having an open center through which must pass fluid flowing through the valve flow passage in the valve housing; the tubular valve element when in sealing engagement with the valve seat extending across the line of flow between its central portion and the annular portion of the passage, and closing the valve passage at the annular portion thereof, and when away from sealing engagement with the valve seat opening the valve passage for fluid flow therethrough; a fluid pressure-receiving surface on the tubular valve element, exposed to fluid pressure in the annular portion of the valve fluid passage, and tending under a sufficient fluid pressure to move the tubular valve element towards an open position; and bias means acting on the tubular valve element and tending to move the tubular valve element towards the closed position, so that only at a fluid pressure differential across the valve element exceeding a predetermined minimum will the valve element move against the biasing force of the bias means from the closed into an open position.

10 Claims, 4 Drawing Figures

UNIDIRECTIONAL FLOW CONTROL VALVE

It is frequently important to ensure that fluid flow in a fluid line proceeds only in one direction and not in the reverse direction, or that it proceed in the reverse direction only under certain conditions of fluid pressure and flow. For example, it is normally desirable that fluid flow through a filter proceed only in the forward direction and not in the reverse direction, because the reverse flow will tend to unload the contaminant material removed by the filter, and the resultant unloading of the filter can have disastrous consequences. Similarly, flow in one direction through an instrument may be necessary for operation of a pump, but reverse flow may damage the pump.

In such situations, it is customary to provide a unidirectional check valve, which permits fluid flow in one direction but not in another. Various types of check valves are available, ranging from simple structures of resilient material such as duckbill valves, umbrella valves, and flap valves to the more sophisticated and considerably more complicated poppet valve structures described in U.S. Pat. Nos. 3,134,394 to Ohta, 2,577,851 to Hribar, 2,415,750 to Melichar, 2,667,895 to Pool et al, and 3,054,420 to Williams. In all of these structures, a poppet valve seats against a valve seat in the closed position, in response to flow from one direction, and opens, moving away from the valve seat, in response to flow from the opposite direction.

All of these valve constructions have the disadvantage that a large biasing force is required to hold the valve closed, and that because of the large biasing force, the degree of opening of the valve is in direct proportion to the differential fluid pressure across the valve. If the valve is spring-biased, as in the case of a poppet valve, the force required to open the valve increases geometrically as the opening becomes greater, since as a spring is put under stress, the force required to move the spring further becomes greater. Similarly, in the case of a resilient material, the resistance to distention increases as the resilient material distends under fluid pressure.

The result is that such valves are not suitable for providing immediately after opening a high rate of flow or a high flow velocity, because of the difficulty in compelling the valve to open fully.

A further problem is created by the amount of space taken up by the valve. Poppet valves, duckbill valves, flap valves, and umbrella valves all require space into which the valve element can move when it moves away from the valve seat, and this space necessarily is waste space not available for flow, since the valve element obstructs flow there. The larger the flow required, the larger the poppet or other valve element, and the larger the valve element, the heavier it is, and the more difficult it is to move, with a resultant greater interference with flow rate when the valve opens.

These difficulties combine to give rise to an even more pressing problem, and that is energy loss. Such valves invariably introduce a pressure drop which significantly increases the power needed to maintain flow downstream of the valve, and at today's energy costs, this can be extremely expensive, especially where electric power or petroleum-based fuels are used.

In accordance with the invention, a flow control valve is provided which requires very little space, and which affords a full and unobstructed passage for flow when open. The result is a negligible pressure drop across the valve, and an important energy saving. Moreover, the valve of the invention is so light that it can be made to open fully at even the small fluid pressure differentials encountered when flow begins from a given direction, and thus can accommodate high flow rates immediately following opening.

The flow control valve in accordance with the invention comprises, in combination, a valve housing; a valve fluid flow passage therethrough substantially free from sharp bends and abrupt changes in direction and having an enlarged intermediate portion; a valve seat disposed in the enlarged portion of the fluid flow passage, defining the passage as an annulus about the outer periphery of the valve seat; a tubular valve element reciprocably disposed in a portion of the flow passage and movable between open and closed positions, into and away from engagement with the valve seat; having an open center through which must pass fluid flowing through the valve flow passage in the valve housing; the tubular valve element when in sealing engagement with the valve seat extending across the line of flow between its central portion and the annular portion of the passage, and closing the valve passage at the annular portion thereof, and when away from sealing engagement with the valve seat opening the valve passage for fluid flow therethrough; a fluid pressure-receiving surface on the tubular valve element, exposed to fluid pressure in the annular portion of the valve fluid passage, and tending under a sufficient fluid pressure to move the tubular valve element towards an open position; and bias means acting on the tubular valve element and tending to move the tubular valve element towards the closed position, so that only at a fluid pressure differential across the valve element exceeding a predetermined minimum will the valve element move against the biasing force of the bias means from the closed into an open position.

The bias means can be arranged to oppose movement of the valve element with a force only sufficient to retain the valve closed when flow stops, and to permit the valve to open as soon as flow begins, in the desired flow direction. The valve will then open immediately, when flow begins in the desired flow direction, whereas it will remain closed when flow is attempted in the opposite direction. In this embodiment, the valve is a true flow control valve, and the predetermined differential fluid pressure at which it opens is at a minimum.

The bias means also can be arranged to oppose movement of the valve element from a closed to an open position at any force up to a predetermined minimum differential fluid pressure, which exceeds the normal differential fluid pressure. In this embodiment, the valve is a pressure relief valve, that opens only when normal line pressure is exceeded.

The flow control valve in accordance with the invention can be used singly, in order to ensure that flow proceeds in one direction but not in the other, in a fluid line. It can also be used in tandem and in parallel, allowing fluid flow to proceed in either direction through a fluid line, under the same or different conditions, opening at a predetermined same or different fluid pressure differential across the valve. Two pairs of valves in opposed alignment can also be used to ensure that regardless of the direction of flow in a fluid line, the direction of flow through a filter assembly or other unidirectional device in fluid flow connection with the line will be the same.

By utilizing the open tubular passage of the valve element for fluid flow, the valve of the invention is capable of passing a larger fluid flow at a lower pressure drop than other designs of valve.

An advantage of the tubular construction is that the valve element can be light in weight, and reciprocate very quickly between open and closed positions in several milliseconds.

Sealing means can be provided between the valve element and the wall of the passage through the valve housing to prevent fluid leakage therebetween through the valve, as well as between the valve element and the valve seat. A sealing element is not essential, and a fluid-tight fit between the valve element and the tubular valve housing and the valve seat can also be employed, and is preferred, especially at high fluid pressures, such as may be encountered in hydrostat systems.

Since the valve element is normally closed when there is no fluid flow, the valve also serves as an anitdrain-back valve. If the valve is in series with a filter element when a filter element is being changed, the valve prevents loss of fluid from the line leading to the motor, and since the pump is in effect a closed valve, there is no loss of fluid from the line leading to the pump. Consequently, the only fluid lost during a filter change is the fluid in the filter bowl.

Preferred embodiments of the invention are illustrated in the drawings, in which.

Figure 1:
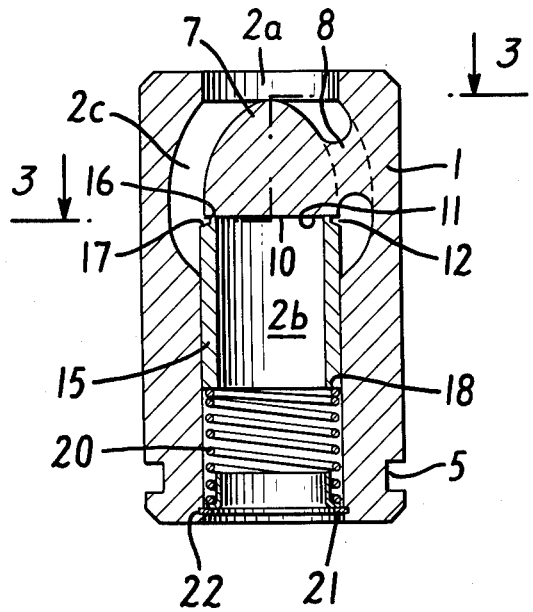
FIG. 1 represents a view in longitudinal section of one embodiment of unidirectional flow control valve in accordance with the invention, showing the tubular valve element in the closed position in one direction of flow.

The tubular valve housing has as the wall of the fluid flow passage therethrough an internal bearing surface or track along which the valve element travels during its reciprocating movement between open and closed positions. The bearing surface or track can be the internal passage wall of the housing, along which the valve elements can move. Alternatively, a bearing insert or sleeve can be placed within the passage of the housing, to serve as a valve element track. Such a surfce if porous will be self-lubricating due to the fluid passing through the system filling the pores of the surface or sleeve.

For convenience and ease of manufacture, the tubular housing and/or the track are cylindrical, and the valve element is also cylindrical, and coaxial therewith. However, any other cross-sectional tubular configuration can be used, such as square, triagular, or polygonal. Tubular configurations not round constrain the valve element to reciprocating movement, and prevent rotation, which is desirable in some systems.

The valve element has an external configuration matching the bearing surface or track within the tubular housing, for reciprocating movement therealong between its limiting positions. The length of movement of the valve element is in no way critical, and the bearing surface or track is long enough to accommodate such movement.

Normally, although not necessarily, the valve element is tubular, and has a central passage therethrough for normal fluid flow. In this form, the valve is particularly adapted for use as a relief valve or flow directional control valve in a filter assembly, in which the valve can be placed within the internal core of a tubular or cylindrical filter element, thus saving space. The valve opens to fluid flow only in one direction therethrough, to prevent backflow, but permit relief flow, or forward flow.

The tubular valve element is provided with an annular pressure-receiving surface which receives fluid pressure on one side thereof, and thus registers differential fluid pressure thereacross. The valve element is operatively connected to the pressure-receiving surface in a manner to be urged in one direction, towards either the open or the closed position, as desired. The pressure receiving surface should have a differential pressure-receiving area sufficient to overcome the biasing force of the bias means and move the valve element in the desired direction.

Such a pressure surface is usefully formed in a tubular valve element as a ledge at one end surface or on the tube, extending all or only part of the way around the tube, and leading to a portion of larger or lesser diameter. It is also possible to provide one or more projecting vanes or flanges along the periphery of the valve element. A sealing element or ring operatively connected to the valve element at its periphery can serve as a pressure surface.

Normally, the valve element is arranged to move in the desired direction to an open or a closed position, under the impulse of the pressure-receiving surface. When opening, the valve element can expose a passage for bypass of a filter element, or for other purposes. The valve opening can extend over all or part of the circumference of the valve element, according to the flow required.

The exterior of the valve element can be made to fit with a close clearance against a bearing surface or track of the tubular housing. The clearance can be sufficiently close so that a leak-tight seal is formed therebetween, preventing leakage past the relief valve.

It is also possible to interpose a sealing element between the exterior of the valve element and the bearing surface or track. Such a sealing element can be fixed to the wall of the tubular housing or to the valve element; in the former it is stationary, and in the latter it reciprocates with the valve element. It has, however, been found desirable to provide a sealing element which is not fixed to either, but which floats freely in the space between the valve element and the bearing surface or track of the tubular housing. The sealing element in this case can slide or rotate within this space as the valve element reciprocates along the track, reducing friction and thereby the differential pressure force required to move the valve element. The floating sealing element can serve as the pressure-receiving surface to reciprocate the valve element, even though it may move along the valve element as it transmits reciprocating force thereto sufficient to drive the element in one direction or the other.

A sealing element at the valve seat is arranged to engage the sealing surface such as the end of a tubular valve element. An annular seal can be retained in a groove in the surface of the valve seat in a shape conforming to the cross-sectional shape of the valve element. The entire surface of the valve seat can be of resilient sealing material, if desired. An example of a resilient valve seat seal is given in FIG. 4.

One or several bias means is provided, tending to move the valve element towards its valve seat, and opposed to the direction of movement of the valve under the force applied by differential fluid pressure at the pressure-receiving surface. The bias means resists movement of the valve element towards its valve seat under differential fluid pressures up to a predetermined minimum; at higher differential fluid pressures, the force applied to the pressure-receiving surface exceeds the biasing force of the bias means, and compels movement of the valve in the opposite direction. In one such direction, the valve is moved to the open position. Thus, the valve can be arranged to open under such predetermined differential fluid pressure.

The bias means can take any form. A compression or tension spring is easily fitted in the flow passage of the tubular housing without materially obstructing the open space available for fluid flow. A magnetic element can also be used, arranged either to be attracted to or to be repelled from a magnetic element in a fixed location in the tubular housing, so that it attracts or repels the tubular valve element towards the valve seat. In all forms, the bias means impels movement of the valve element in a direction opposed to the direction of the application of the actuating differential fluid pressure on the pressure-receiving surface. A combination of spring bias and magnetic bias means can also be used.

The unidirectional valves of the invention are particularly adapted for use in hydrostat systems, to control flow, or to control flow through and/or bypass of filter assemblies, where (as previously indicated) the valve can be positioned within the internal core of a tubular filter element. If the filter element is retained within a filter housing, the tubular valve housing can be attached to the filter housing, and the filter element attached to the tubular valve housing. For example, one filter end cap can be made with a central aperture that fits snugly over the exterior of the tubular valve housing in a press fit, and a fluid-tight seal therebetween. The valve thus can retain the filter element in a desired position in the housing, and the press fit makes it possible to quickly change filter elements without in any way interfering with the attachment of the valve to the housing. Other arrangements are also possible, however. For instance, the valve can be mounted and retained solely within the filter core, and attached or removed from the filter housing together with the filter element, the filter element being mounted to the housing in conventional manner.

The tubular valve of the invention can be made of any suitable materials, such as plastic or metal. Stainless steel is a particularly durable material of construction, suitable for most uses, especially in filter elements, because of resistance to attack by fluids, and is preferred both for the valve element and for the tubular valve housing and other components of the valve. It is, however, also suitable to make the tubular valve element of plastic, such as polytetrafluoroethylene, nylon, polycarbonates, phenol-formaldehyde, urea-formaldehyde, or melamine-formaldehyde resins. It is also suitable to fabricate the valve housing and valve element of stainless steel, and interpose a durable plastic sleeve or insert therebetween as a track, such as, for example, polytetrafluoroethylene or nylon.

A particularly advantageous feature of the tubular valves of the invention is that their construction makes it possible to case or mold the tubular housing, and to use sheet metal for the internal sleeve, and for the valve element. This considerably simplifies their fabrication, and reduces manufacturing costs, as compared to other types of valves in which machined or extruded components are necessary.

Figure 2:
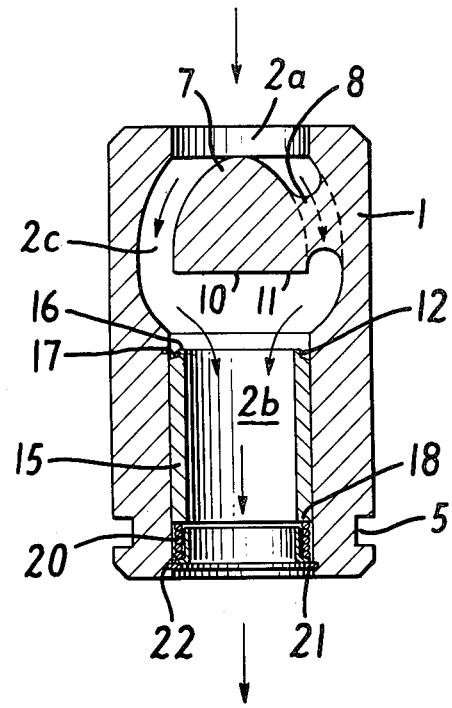
FIG. 2 is another view in longitudinal section of the flow control valve shown in FIG. 1, with the tubular valve element in the open position, as a result of change in direction of fluid flow, proceeding now in the reverse direction from that of FIG. 1.
Figure 3:
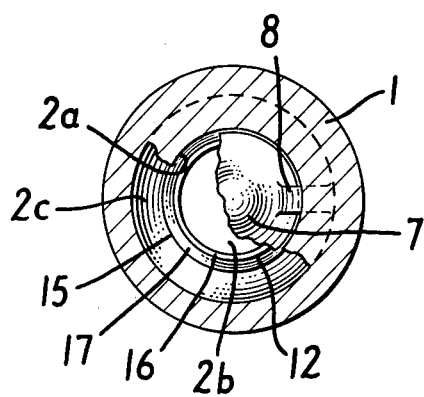
FIG. 3 is a cross-sectional view taken along the line 3—3 of the flow control valve of FIG. 1.

The flow control valve shown in FIGS. 1 to 3 includes a valve housing 1 with a central fluid flow passage 2a, 2b, therethrough having an enlarged portion 2c therebetween. The valve housing is provided with a circumferential groove 5 for reception of an O-ring or gasket (not shown) for sealing engagement of the housing in a fluid system, such as for example in a hydrostat system or a filter assembly.

Attached to the wall of the passage in the enlarged portion is a valve seat 7, anchored as by welding or brazing or casting by way of the three-legged spider 8 to the valve housing 1. Except for the diversion introduced by the spider 8, the passage 2c is essentially an annulus, in the portion surrounding the valve seat 7. The cross-sectional area of passage 2c is at least equal to the cross-sectional area of the passages 2a and 2b upstream and downstream thereof, so that it offers no flow restriction. It will be noted that the valve seat 7 is held in the center of the enlarged portion 2c.

The tubular valve element 15 is coaxial with the passage 2b, and is concentrically disposed about the periphery of the passage 2b, fitting snugly but slidably against the wall thereof. Bearing against one end 18 of the valve element 15 is a coil compression spring 20. The other end of the spring is anchored against the lock ring 21, inserted in a spring fit in the narrow groove 22 in the wall of the passage 2b. The spring 20 thus biases the tubular valve element 15 against the valve seat 7 in the peripheral portion 11, in sealing engagement therewith, and this is the normal closed position of the valve.

At the face 10, the valve seat 11 is flat and smooth, at least in the peripheral portion 11. This ensures a leak-tight seal thereagainst by the flat lapped land 16 of the tubular valve element 15. The land 16 also provides a pressure-receiving surface 17, exposed to upstream pressure in passage 2c.

It will thus be seen, as shown in FIG. 1, that the spring 20 exerts a biasing force upon the valve element 15, tending to retain it in the closed position shown in FIG. 1. Fluid in the portions 2a, 2b and 2c of the fluid passage is retained there by the valve element 15, when in the closed position shown. Because opening of the valve element requires movement against fluid pressure in passage 2b, flow from passage 25 towards passages 2a, 2c is prevented by the closed valve.

Fluid flow in the opposite direction from passages 2a, 2c is prevented only until a predetermined minimum pressure differential across the valve element towards passage 2b is reached. This pressure differential can be so low that the valve opens when flow begins, or so high as to prevent flow until a relief function is needed to relieve excessive fluid flow or pressure in passages 2a, 2c.

Therefore, fluid in the portions 2a, 2c can and does apply fluid pressure against the pressure-receiving surface 17. When the fluid pressure differential across the valve is sufficiently high because of a higher fluid pressure in the portions 2a, 2c, than in the portion 2b, arising from flow in that direction, eventually the biasing force of the spring 20 is exceeded. When this happens, the tubular valve element slides into the position shown in FIG. 2, opening the annular passage 2c, and allowing flow of fluid from the portions 2a, 2c into the portion 2b of the fluid passage.

The tubular valve element 15 is light in weight, and moves virtually instantaneously when the biasing force of the spring 20 is exceeded. The valve opens fully to the open position shown in FIG. 2.

Since the open area in the portions 2a and 2c of the fluid passage is substantially the same as the open area in the central portion 2b of the flow passage, the valve does not offer any significant obstruction to the flow of the fluid through the valve housing, when the valve is in the open position shown in FIG. 2. Thus, there is substantially instantaneous full flow through the passage when the valve is open, and flow proceeds from that direction, with a negligible pressure drop.

The valve remains in the position shown in FIG. 2 while flow continues in the forward direction shown, from the portion 2a of the passage towards portion 2b. As soon as the flow stops, however, the pressure tending to retain the valve in the open position against the force of the spring becomes insufficient, and as soon as it does so, the spring moves the valve smartly back into a fluid-tight seal against the valve seat 11, into the position shown in FIG. 1. The valve in this position will prevent flow from the reverse direction, as well as flow in the forward direction, but it will always be ready and able to accommodate flow in the forward direction, when the fluid pressure differential across the valve once again exceeds the predetermined minimum.

Figure 4:
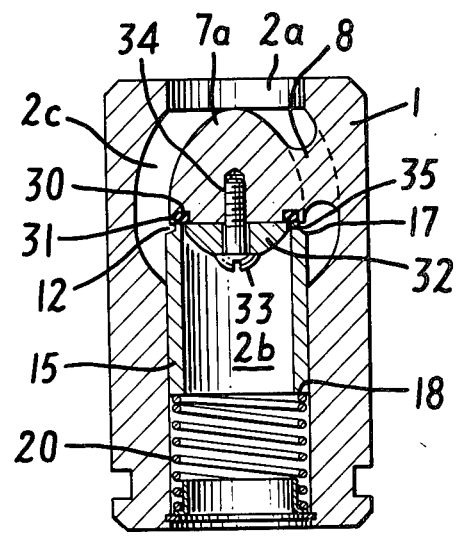
FIG. 4 is a detail view of the valve seat in another embodiment of flow control valve in which the valve element seals against a sealing ring.

The valve seat 7a shown in FIG. 4 has a resilient O-ring seal 30 retained in a groove 31 and a metal convex cap 32 held by screw 33, which threads into socket 34 of the valve seat 7a. The seal 30 constitutes the sealing face of the valve seat that engages the end 12 of the tubular valve element 15. The periphery of the cap 32 serves as a guide to direct the valve end 12 to engagement with the valve seat. In other respects, the structure is the same as that of FIGS. 1 to 3.

The spring 20 biases the tubular valve element against the seal 30, in sealing engagement therewith, with the pressure-receiving surface 17 exposed to fluid pressure in the passage 2c.

The resilient seal ensures leak-tightness at high fluid pressure differentials across the valve.

Having regard to the foregoing disclosure, the following is claimed as the inventive and patentable embodiments thereof:

1. A unidirectional flow control valve capable when closed of shutting off flow through a fluid line in one direction, and when open of accommodating the full flow of fluid through the fluid line in the other direction at uniform velocity and a high flow rate with negligible pressure drop, comprising, in combination, a valve housing; an internal wall of the housing defining a valve fluid flow passage of fixed dimensions extending therethrough, having aligned coaxial straight end portions interconnected by an enlarged coaxial bulbous outwardly curved intermediate portion; a fixed valve member having an end surface defining a valve seat, the remainder of the valve member having a smoothly contoured and substantially tear drop shape, the valve seat receiving one end of a tubular valve element and having a substantially flat and smooth surface for fluid-tight sealing therewith, the valve member being disposed coaxially and concentrically in the enlarged portion of the fluid flow passage, and attached to the valve housing at the side of the enlarged portion of the fluid flow passage in a manner to permit fluid flow therepast and defining an outwardly curved valve fluid flow passage as an annulus of fixed dimensions about its outer periphery; the outer periphery of the valve member being shaped to define an annular passage substantially free from sharp bends and changes in direction; a tubular valve element that is light in weight reciprocably disposed coaxially and concentrically in one end portion of the flow passage adjacent the annular passage and movable quickly along the internal wall of the housing in either direction between a closed position in which it extends across the annular passage and an open position in which it is nested against the side walls of the end portion of the fluid flow passage and movable only between fully open and fully closed positions, into and away from engagement with the valve seat; having an open central passage through which when the tubular valve element is in the open position must pass fluid flowing through the valve flow passage in the valve housing; the tubular valve element when in sealing engagement with the valve seat extending across the line of flow between its central portion and the annular portion of the passage, and closing the valve passage at the annular portion thereof, and when away from sealing engagement with the valve seat adopting a nonflow-obstructing position abutting the side walls of the end portion of the flow passage that is concentric and coaxial to the end portion of the fluid flow passage and opening the valve passage for fluid flow through the open center of the tubular valve element; the central passage of the tubular valve element, the annular fluid flow passage and the end portions of the fluid flow passage having open volumes capable of accommodating full fluid flow at uniform velocity and a high flow rate with negligible pressure drop, when the tubular valve element is in a fully open position; a fluid pressure-receiving surface on the surface on the tubular valve element at the end that engages the valve seat, facing and exposed to fluid pressure in the annular portion of the valve fluid passage, and tending under a sufficient fluid pressure to move the tubular valve element from the closed into an open position; and bias means acting on the tubular valve element and retaining the tubular valve element in the closed position until a fluid pressure differential across the tubular valve element exceeding a predetermined minimum is reached, and then allowing the tubular valve element to move against the biasing force of the bias means immediately from the closed into a fully open position allowing full flow of fluid through the fluid line to pass through the valve.

2. A flow control valve in accordance with claim 1 in which the bias means is a coil spring.

3. A flow control valve according to claim 4 in which the coil spring is a compression spring.

4. A flow control valve according to claim 1 in which the tubular valve element at the end that engages the valve seat terminates in a sealing land, with a side facing outwardly of the tubular valve element and serving as a fluid pressure-receiving surface.

5. A flow control valve according to claim 1 in which the tubular valve element slidingly engages the wall of the first fluid flow passage in a snug relatively leaktight seal.

6. A flow control valve according to claim 1, in which the exterior of the tubular valve element and the internal wall of the housing defining the fluid flow passage have a close enough clearance to define a fluid-tight seal therebetween.

7. A flow control valve according to claim 1, in which the valve seat has a sealing surface of resilient material.

8. A flow control valve in accordance with claim 1 in which the bias means is arranged to open at the fluid pressure differential developed across the valve element when flow begins from the permitted direction.

9. A flow control valve in accordance with claim 1 in which the bias means is arranged to open at a fluid pressure differential developed across the tubular valve element at a line pressure exceeding normal line pressure.

10. A fluid line comprising in combination a fluid flow passage adapted for flow in either direction therethrough and a flow control valve according to claim 1 controlling the flow in the fluid passage so as to proceed in one direction only.

* * * * *

UNITED STATES PATENT OFFICE
CERTIFICATE OF CORRECTION

Patent No. 4,116,212                    Dated September 26, 1978

Inventor(s) Roydon B. Cooper

It is certified that error appears in the above-identified patent and that said Letters Patent are hereby corrected as shown below:

Column 1, line 2, Abstract, "vave" should be --valve--.

Column 3, line 19, "anit-" should be --anti- --.

Column 3, line 52, "surfce" should be --surface--.

Column 3, line 60, "triagular" should be --triangular--.

Column 8, line 38, delete "on the surface".

Column 8, line 55, "4" should be --2--.

Signed and Sealed this

Twenty-first Day of August 1979

[SEAL]

Attest:

Attesting Officer

LUTRELLE F. PARKER
Acting Commissioner of Patents and Trademarks